United States Patent
Adler et al.

(10) Patent No.: US 6,699,339 B2
(45) Date of Patent: Mar. 2, 2004

(54) GYPSUM PLASTER COMPOSITIONS WITH IMPROVED ADHESION TO PLASTIC SURFACES AND METAL SURFACES

(75) Inventors: Klaus Adler, Burghausen (DE); Alois Sommerauer, Tarsdorf (AT)

(73) Assignee: Wacker Polymer Systems GmbH & Co. KG, Burghauesen (DE)

( * ) Notice: Subject to any disclaimer, the term of this patent is extended or adjusted under 35 U.S.C. 154(b) by 57 days.

(21) Appl. No.: 10/045,355

(22) Filed: Nov. 7, 2001

(65) Prior Publication Data

US 2002/0121326 A1 Sep. 5, 2002

(30) Foreign Application Priority Data

Dec. 21, 2000 (DE) .......................... 100 64 083

(51) Int. Cl.⁷ .......................... C04B 11/00; C04B 24/04
(52) U.S. Cl. .......................... 156/39; 264/333; 106/219; 106/778; 106/785; 106/819
(58) Field of Search .......................... 156/39; 264/333; 106/219, 243, 680, 715, 726, 735, 772, 778, 785, 819, 822

(56) References Cited

U.S. PATENT DOCUMENTS 2,770,840 A * 11/1956 Biefeld ........................ 264/232
4,261,755 A    4/1981 Berry et al.
4,507,154 A * 3/1985 Burge et al. ................. 106/315
5,702,828 A * 12/1997 Adler et al. ................. 428/540
6,350,779 B1 * 2/2002 Noack et al. ................ 514/492

FOREIGN PATENT DOCUMENTS

DE      1 29 070      12/1977
DE   198 53 450 C2    5/2000

OTHER PUBLICATIONS

J. Schulze, Tondindustrie—Zietung 9, 1985, "Redispersionspulver Im Zement".
Derwent Abstract corresponding to DD 129070 [AN 1978–17835].
Derwent Abstract corresponding to DE 19853450 [AN 2000–401042].

* cited by examiner

*Primary Examiner*—Jeff H. Aftergut
*Assistant Examiner*—Todd J. Kilkenny
(74) *Attorney, Agent, or Firm*—Brooks Kushman P.C.

(57) ABSTRACT

Gypsum plaster compositions with improved adhesion to plastic surfaces and metal surfaces comprise from 10 to 90% by weight of gypsum plaster, based on the total weight of the composition, and also, where appropriate, other additives, and a combination of: a) one or more water-redispersible polymer powders based on one or more vinyl ester, (meth) acrylate, vinylaromatic, olefin, 1,3-diene, or vinyl halides monomers, and optionally other monomers copolymerizable therewith; and b) one or more alkali metal and/or alkaline earth metal salts of short-chain fatty acids having from 1 to 4 carbon atoms in the hydrocarbon skeleton and from 1 to 4 carboxy groups, and which contain no OH groups.

20 Claims, No Drawings

GYPSUM PLASTER COMPOSITIONS WITH IMPROVED ADHESION TO PLASTIC SURFACES AND METAL SURFACES

BACKGROUND OF THE INVENTION

1. Field of the Invention

The invention relates to gypsum plaster compositions with improved adhesion to plastic surfaces and metal surfaces, and to their use.

2. Description of the Related Art

It is known that the adhesion of cement mortars to various substrates is increased by adding film-forming polymers This effect is successfully utilized in modified thin-layer mortars, for example, and in exterior insulation systems. In addition to the aqueous dispersions used for this purpose there are also spray-dried dispersions known as dispersion powders. After addition of dispersion powder, cement-based mortars also adhere to PVC substrates and wood substrates (J. Schulze, TONINDUSTRIE-ZEITUNG 9, 1985). Gypsum trowelling compounds are often used as joint fillers for filling the joints between plasterboard. Although the addition of dispersion powders to gypsum trowelling compounds increases the adhesion to masonry, gypsum substrates, and concrete, the simple addition of dispersion powders does not increase adhesion to other substrates such as plastics, for example rigid PVC, or to metal substrates like aluminum sheet, or increases adhesion to such substrates only marginally. Even when using a high proportion of dispersion powder, no adhesion is achieved on sheet aluminum, and adhesion to other substrates, for example PVC, is also low.

It would be desirable to provide gypsum trowelling compounds which adhere to both plastic and metal substrates.

SUMMARY OF THE INVENTION

It has now been surprisingly discovered that the addition of salts of lower fatty acids in combination with dispersion powders, markedly increased the adhesion of gypsum trowelling compounds to these substrates. Calcium formats has been used as an accelerator for cement setting in cement mortars. However, this effect as an accelerator is not known to be applicable to gypsum-based compositions.

DETAILED DESCRIPTION OF THE PREFERRED EMBODIMENTS

The present invention provides gypsum plaster compositions with improved adhesion to plastic surfaces and metal surfaces, these compositions comprising from 10 to 90% by weight of gypsum plaster, based on the total weight of the composition, and also, where appropriate, other additives, wherein a combination of: a) one or more water-redispersible polymer powders based on one or more monomers from the group consisting of vinyl esters, (meth) acrylates, vinylaromatics, olefins, 1,3-dienes, and vinyl halides, and, where appropriate, other monomers copolymerizable therewith; and b) one or more salts from the group of the alkali metal and alkaline earth metal salts of short-chain fatty acids which have from 1 to 4 carbon atoms in the hydrocarbon skeleton, from 1 to 4 carboxy groups, and which contain no OH groups, is present.

Suitable vinyl esters are those of carboxylic acids having from 1 to 15 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 11 carbon atoms, such as VeoVa9® or VeoVa10® vinyl esters available from Shell. Particular preference is given to vinyl acetate. Suitable monomers from the group of acrylates and methacrylates are esters of unbranched or branched alcohols having from 1 to 18 carbon atoms. Preferred methacrylates and acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particular preference is given to methyl acrylate, methyl methacrylate, n-butyl acrylate, tert-butyl acrylate, and 2-ethylhexyl acrylate. Preferred vinylaromatics are styrene, methylstyrene, and vinyl toluene. A preferred vinyl halide is vinyl chloride. Preferred olefin include ethylene and propylene, and the preferred dienes are 1,3-butadiene and isoprene.

Preference is given to vinyl acetate homopolymers; to vinyl acetate copolymers with ethylene and/or with vinyl esters of monocarboxylic acids having from 5 to 15 carbon atoms; to styrene copolymers with acrylates of alcohols having from 1 to 18 carbon atoms or with 1,3-dienes, and to vinyl chloride copolymers with ethylene and/or with vinyl esters of monocarboxylic acids having from 2 to 15 carbon atoms. The polymers mentioned also contain, based in each case on the total weight of the polymer, where appropriate, from 0.05 to 30.0% by weight, preferably from 0.5 to 15% by weight, of one or more auxiliary monomer units. Suitable auxiliary monomers are ethylenically unsaturated mono- or dicarboxylic acids, and also anhydrides of these, preferably acrylic acid, methacrylic acid, itaconic acid, crotonic acid, fumaric acid, maleic acid, and maleic anhydride; ethylenically unsaturated carboxamides and carbonitriles, preferably acrylamide, methacrylamide, acrylamidoglycolic acid, and acrylonitrile; ethylenically unsaturated sulfonic acids and salts of these, preferably vinylsulfonic acid and 2-acrylamido-2-methylpropanesulfonic acid.

Most preferably the water-redispersible dispersion powders a) are based on the following copyolymers:

vinyl acetate-ethylene copolymers having from 5 to 50% by weight of ethylene units;

vinyl acetate copolymers having from 1 to 40% by weight of vinyl laurate units and from 50 to 95% by weight of units derived from vinyl esters of α-branched monocarboxylic acids having from 5 to 10 carbon atoms, for example the vinyl ester of Versatic® acid and, where appropriate, from 5 to 40% by weight of ethylene units;

vinyl acetate copolymers having from 70 to 95% by weight of vinyl laurate units or units of vinyl esters of α-branched monocarboxylic acids having from 5 to 10 carbon atoms, i.e. the vinyl ester of Versatic® acid;

styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight;

vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

The polymers mentioned as most preferred may moreover also contain the amounts mentioned of the abovementioned auxiliary monomers. The data in % by weight for the content of the monomer units in the polymers mentioned always give a total of 100% by weight.

The polymers mentioned are prepared in a known manner, preferably by emulsion polymerization in an aqueous medium, with initiation of the polymerization by means of the water-soluble free-radical polymerization initiators conventionally used for this purpose, and in the presence of the protective colloids and emulsifiers commonly used in emulsion polymerization. To prepare the dispersion powders, the resultant aqueous dispersion is dried in a known manner, where appropriate, with addition of spraying aids or antiblocking agents, for example by spray drying or freeze drying, preferably spray drying. Preference is given to emulsion polymers stabilized using protective colloids, in particular, polyvinyl alcohol protective colloids.

Materials preferred as component b) are the sodium, potassium, and calcium salts of the lower fatty acids having from 1 to 4 carbon atoms in the hydrocarbon skeleton and from 1 to 4 carboxy groups. Preferred fatty acids are formic acid, acetic acid, propionic acid, the butanoic acids, oxalic acid, succinic acid, and adipic acid. Particular preference is given to the sodium, potassium, and in particular the calcium salts of formic acid or acetic acid. Calcium formate is most preferred.

The proportion of the dispersion powder a) is preferably from 4 to 40% by weight, more preferably from 6 to 15% by weight, based in each case on the total weight of the pulverulent (i.e. "dry") plaster composition. The proportion of fatty acid salt b) is preferably from 0.3 to 10% by weight, more preferably from 0.5 to 2.0% by weight, based in each case on the total weight of the pulverulent plaster composition.

Among the types of gypsum plaster, preference is given to α- and β-semihydrate ($CaSO_4 \cdot \frac{1}{2} H_2O$) in such forms as calcined gypsum, stucco plaster, or modeling plaster. Other suitable types of gypsum plaster are flooring plaster, Keene's cement, and anhydrite, and also the calcium sulfate produced in flue gas desulfurization. The gypsum plaster composition may also comprise the usual aggregates and additives. Usual aggregates for gypsum mortar are hydrated lime, preferably at from 1 to 30% by weight, and also inert fillers such as calcium carbonate, dolomite, calcium sulfate and/or quartz sand, in the usual amounts, preferably from 5 to 80% by weight. All of the data in % by weight are based on the total weight of the pulverulent gypsum plaster composition. Examples of additives which improve the usage properties of the gypsum plaster composition or the properties of products manufactured therewith are salts of long-chain fatty acids, such as calcium stearate and sodium oleate, silicone waterproofing compositions, fungicides, fibrous materials, accelerators such as dipotassium sulfate, retarders such as tartrates and phosphates, protein derivatives, and thickeners such as cellulose ethers, starch ethers, dextrins, and bentonites.

To modify the gypsum plaster, the dispersion powder a) and the fatty acid salt b) are mixed and homogenized with the gypsum plaster in suitable mixers, where appropriate with the other ingredients such as aggregates and additives. Where appropriate, the dispersion powder may also be in the form of an aqueous dispersion when it is added. The fatty acid salts b) may also be in the form of their aqueous solutions or suspensions when they are added. It is preferable for a dry gypsum plaster composition to be prepared and for the water required for usage to be admixed at the building site prior to usage.

The compositions modified according to the invention are especially suitable for use as a gypsum mortar for troweling compounds, joint fillers, flowable $CaSO_4$ screeds, jointing compositions, adhesive mortars, or for use for producing gypsum plasterboard or gypsum plaster moldings. Examples of other applications are renders and stuccos, including those for outdoor applications. The modified compositions of the invention have markedly improved adhesion to aluminum and rigid PVC.

The examples below serve for further illustration of the invention:

Preparation of the Mortar Mixture:

In the Examples and Comparative Examples which follow, gypsum mortars were prepared using the mixing specifications given in Tables I and II. The constituents of the mixing specifications were premixed dry, the water content charged to a mortar mixer, and the dry mix introduced with stirring.

Production of Test Specimens and Adhesion Testing:

A silicone rubber template of thickness 5 mm with 5 ×5 $cm^2$ cutouts was placed on the respective substrates (aluminum, rigid PVC) to be tested, and the cutouts were filled with the ready-mixed compositions by means of a trowel. Pull handles were then adhesively-bonded to the test specimens using a two-component adhesive. Adhesion was determined in accordance with DIN 18156 using Herion tension equipment and a load increase rate of 250 N/s. The averages for the adhesion from each series of measurements are given in Tables I and II.

The results in Table I show the synergistic action of the combination of water-redispersible dispersion powders a) with the fatty acid salts b). Table II shows that the addition of calcium formate improves the adhesion both to plastic and to metal, even at relatively low gypsum plaster contents.

TABLE I

| Example | C1 | 2 | 3 | 4 | 5 |
|---|---|---|---|---|---|
| Alabaster/modeling plaster | 800.0 | 800.0 | 800.0 | 800.0 | 800.0 |
| Calcium carbonate (Durcal) | 189.0 | 189.0 | 189.0 | 189.0 | 189.0 |
| Dispersion powder | 80.0 | 80.0 | 100.0 | 60.0 | 80.0 |
| Calcium sulfate ($CaSO_4 \cdot 2H_2O$) | 10.0 | 10.0 | 10.0 | 10.0 | 10.0 |
| Cellulose ether (Culminal) | 1.0 | 1.0 | 1.0 | 1.0 | 1.0 |
| Starch ether (Amylotex) | 0.5 | 0.5 | 0.5 | 0.5 | 0.5 |
| Retarder (Retardan P) | 0.3 | 0.3 | 0.3 | 0.3 | 0.3 |
| Calcium formate |  | 4.0 | 5.0 | 5.0 | 10.0 |
| Total | 1089.8 | 1093.8 | 1105.8 | 1065.8 | 1090.8 |
| ml of water (65 ml/100 g) | 708 | 711 | 719 | 693 | 709 |
| Tensile bond strength |  |  |  |  |  |
| Rigid PVC (N/mm$^2$) | 0 | 0.04 ± 0.01 | 0.11 ± 0.01 | 0.06 ± 0.02 | 0.11 ± 0.01 |
| Aluminum sheet (N/mm$^2$) | 0 | 0.10 ± 0.01 | 0.20 ± 0.02 | 0.10 ± 0.06 | 0.20 ± 0.01 |

TABLE I-continued

| Example | 6 | 7 | 8 |
|---|---|---|---|
| Alabaster/modeling plaster | 800.0 | 800.0 | 800.0 |
| Calcium carbonate (Durcal) | 189.0 | 189.0 | 189.0 |
| Dispersion powder | 80.0 | 80.0 | 80.0 |
| Calcium sulfate ($CaSO_4 \cdot 2H_2O$) | 10.0 | 10.0 | 10.0 |
| Cellulose ether (Culminal) | 1.0 | 1.0 | 1.0 |
| Starch ether (Amylotex) | 0.5 | 0.5 | 0.5 |
| Retarder (Retardan P) | 0.3 | 0.3 | 0.3 |
| Sodium formate | 10.0 | | |
| Potassium formate | | 10.0 | |
| Sodium acetate | | | 10.0 |
| Total | 1090.8 | 1090.8 | 1090.8 |
| ml of water to total | 500.0 | 500.0 | 500.0 |
| Tensile bond strength | | | |
| Rigid PVC ($N/mm^2$) | 0.21 ± 0.02 | 0.15 ± 0.05 | 0.17 ± 0.02 |
| Aluminum sheet ($N/mm^2$) | 0.20 ± 0.05 | 0.21 ± 0.04 | 0.21 ± 0.08 |

TABLE II

| Example | C9 | 10 | 11 | C12 | 13 |
|---|---|---|---|---|---|
| Alabaster/modeling plaster | 500.0 | 500.0 | 500.0 | 300.0 | 300.0 |
| Calcium carbonate (Durcal) | 403.2 | 403.2 | 403.2 | 603.2 | 603.2 |
| Calcium sulfate ($CaSO_4 \cdot 2H_2O$) | 10.0 | 10.0 | 10.0 | 10.0 | 10.0 |
| Dispersion powder | 100.0 | 100.0 | 60.0 | 80.0 | 80.0 |
| Cellulose ether (Culminal) | 1.0 | 1.0 | 1.0 | 1.0 | 1.0 |
| Starch ether (Amylotex) | 0.5 | 0.5 | 0.5 | 0.5 | 0.5 |
| Retarder (Retardan P) | 0.3 | 0.3 | 0.3 | 0.3 | 0.3 |
| Calcium formate | | 5.0 | 5.0 | | 5.0 |
| Total | 1015.0 | 1020.0 | 980.0 | 995.0 | 1000.0 |
| ml of water | 508 | 510 | 588 | 448 | 450 |
| Tensile bond strength | | | | | |
| Rigid PVC ($N/mm^2$) | 0.12 ± 0.01 | 0.19 ± 0.02 | 0.11 ± 0.01 | 0.10 ± 0.04 | 0.28 ± 0.01 |
| Aluminum sheet ($N/mm^2$) | 0.10 ± 0.07 | 0.20 ± 0.02 | 0.20 ± 0.02 | 0.20 ± 0.04 | 0.30 ± 0.10 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise. Identification of polymer units such as vinyl acetate, ethylene, etc., indicates that the polymer contains units derived from the respective monomers.

What is claimed is:

1. A gypsum plaster composition with improved adhesion to plastic surfaces and to metal surfaces, comprising from 10 to 90% by weight of gypsum plaster, based on the total weight of solid components in the composition, and optionally other additives, further comprising:
    a) one or more water-redispersible polymer powders based on one or more vinyl ester monomers, (meth) acrylate monomers, vinylaromatic monomers, olefin monomers, 1,3-diene monomers, and vinyl halide monomers, and optionally other monomers copolymerizable therewith, and
    b) one or more alkali metal salts and/or alkaline earth metal salts of short-chain fatty acids having from 1 to 4 carbon atoms in the hydrocarbon skeleton and from 1 to 4 carboxy groups, said short chain fatty acids containing no OH groups.

2. The gypsum plaster composition of claim 1, wherein component b) comprises one or more fatty acid salts selected from the group consisting of the sodium, potassium, and calcium salts of formic acid, acetic acid, propionic acid, the butanoic acids, oxalic acid, succinic acid, and adipic acid.

3. The gypsum plaster composition of claim 1, wherein component b) comprises one or more fatty acid salts selected from the group consisting of the sodium, potassium, and calcium salts of formic acid.

4. The gypsum plaster composition of claim 1, wherein component a), comprises one or more of vinyl acetate-ethylene copolymers having from 5 to 50% by weight of ethylene units; vinyl acetate copolymers having from 1 to 40% by weight of vinyl laurate units and from 50 to 95% by weight of units of vinyl esters of α-branched monocarboxylic acids having from 5 to 10 carbon atoms and optionally from 5 to 40% by weight of ethylene units; vinyl acetate copolymers having from 70 to 95% by weight of vinyl laurate units or units of vinyl esters of α-branched monocarboxylic acids having from 5 to 10 carbon atoms; styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight; or vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

5. The gypsum plaster composition of claim 2, wherein component a), comprises one or more of vinyl acetate-ethylene copolymers having from 5 to 50% by weight of ethylene units; vinyl acetate copolymers having from 1 to 40% by weight of vinyl laurate units and from 50 to 95% by weight of units of vinyl esters of α-branched monocarboxylic acids having from 5 to 10 carbon atoms and optionally from 5 to 40% by weight of ethylene units; vinyl acetate copolymers having from 70 to 95% by weight of vinyl laurate units or units of vinyl esters of α-branched monocarboxylic acids having from 5 to 10 carbon atoms; styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight; or vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

6. The gypsum plaster composition of claim 3, wherein component a), comprises one or more of vinyl acetate-ethylene copolymers having from 5 to 50% by weight of ethylene units; vinyl acetate copolymers having from 1 to 40% by weight of vinyl laurate units and from 50 to 95% by weight of units of vinyl esters of α-branched monocarboxylic acids having from 5 to 10 carbon atoms and optionally from 5 to 40% by weight of ethylene units; vinyl acetate copolymers having from 70 to 95% by weight of vinyl laurate units or units of vinyl esters of α-branched monocarboxylic acids having from 5 to 10 carbon atoms; styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight; or vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

7. The gypsum plaster composition of claim 1, wherein the proportion of dispersion powder a) is from 4 to 40% by weight and the proportion of fatty acid salt b) is from 0.3 to 10% by weight, based in each case on the total weight of a pulverulent gypsum plaster composition.

8. The gypsum plaster composition of claim 2, wherein the proportion of dispersion powder a) is from 4 to 40% by weight and the proportion of fatty acid salt b) is from 0.3 to 10% by weight, based in each case on the total weight of a pulverulent gypsum plaster composition.

9. The gypsum plaster composition of claim 3, wherein the proportion of dispersion powder a) is from 4 to 40% by weight and the proportion of fatty acid salt b) is from 0.3 to 10% by weight, based in each case on the total weight of a pulverulent gypsum plaster composition.

10. The gypsum plaster composition of claim 4, wherein the proportion of dispersion powder a) is from 4 to 40% by weight and the proportion of fatty acid salt b) is from 0.3 to 10% by weight, based in each case on the total weight of a pulverulent gypsum plaster composition.

11. A process for preparing the gypsum plaster composition of claim 1, comprising mixing the dispersion powder a) and the fatty acid salt b) with the gypsum plaster and optional aggregates and/or additives.

12. A process for preparing the gypsum plaster composition of claim 1, wherein one or both of the dispersion powder a) and the fatty acid salt are added in the form of aqueous compositions, the dispersion powder a) in the form of an aqueous dispersion, and the fatty acid salt b) in the form of an aqueous solution or suspension.

13. In a gypsum plaster composition for use as a gypsum mortar-based troweling compound, joint filler, flowable $CaSO_4$ screed, jointing composition, or adhesive mortar, the improvement comprising selecting as said gypsum plaster composition the gypsum plaster composition of claim 1, and applying said gypsum plaster composition to a substrate.

14. In a process for producing gypsum plasterboard or gypsum plaster moldings from a gypsum plaster composition, the improvement comprising selecting as a gypsum plaster composition, the gypsum plaster composition of claim 1.

15. In a render or stucco plaster composition, the improvement comprising selecting as said render or stucco plaster composition, the gypsum plaster composition of claim 1.

16. A process for improving the adhesion of a gypsum plaster composition to metal and/or plastic substrates, comprising admixing with gypsum plaster,
   a) from 4 to 40% by weight of a water-redispersible polymer in the form of a dispersion powder or aqueous dispersion thereof, said weight percentages based on solids relative to the total weight of composition solids, said water-redispersible polymer based on one or more vinyl ester monomers, (meth)acrylate monomers, vinylaromatic monomers, olefin monomers, 1,3-diene monomers, and vinyl halide monomers, and optionally other monomers copolymerizable therewith, and
   b) from 0.3 to 10% by weight of an alkali metal salt or alkaline earth metal salt of a short-chain fatty acids having from 1 to 4 carbon atoms in the hydrocarbon skeleton and from 1 to 4 carboxy groups, said short chain fatty acids containing no OH groups.

17. The process of claim 16, comprising from 6 to 15 weight percent of water-redispersible polymer solids and 0.5 to 2 weight percent of b).

18. The process of claim 16, wherein component b) comprises one or more fatty acid salts selected from the group consisting of the sodium, potassium, and calcium salts of formic acid, acetic acid, propionic acid, the butanoic acids, oxalic acid, succinic acid, and adipic acid.

19. The process of claim 16, wherein component a) comprises one or more of vinyl acetate-ethylene copolymers having from 5 to 50% by weight of ethylene units; vinyl acetate copolymers having from 1 to 40% by weight of vinyl laurate units and from 50 to 95% by weight of units of vinyl esters of α-branched monocarboxylic acids having from 5 to 10 carbon atoms and optionally from 5 to 40% by weight of ethylene units; vinyl acetate copolymers having from 70 to 95% by weight of vinyl laurate units or units of vinyl esters of α-branched monocarboxylic acids having from 5 to 10 carbon atoms; styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight; or vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

20. The process of claim 17, wherein component a) comprises one or more of vinyl acetate-ethylene copolymers having from 5 to 50% by weight of ethylene units; vinyl acetate copolymers having from 1 to 40% by weight of vinyl laurate units and from 50 to 95% by weight of units of vinyl esters of α-branched monocarboxylic acids having from 5 to 10 carbon atoms and optionally from 5 to 40% by weight of ethylene units; vinyl acetate copolymers having from 70 to 95% by weight of vinyl laurate units or units of vinyl esters of α-branched monocarboxylic acids having from 5 to 10 carbon atoms; styrene copolymers having from 40 to 60% by weight of n-butyl acrylate units and/or 2-ethylhexyl acrylate units or 1,3-butadiene units; vinyl chloride-ethylene copolymers having an ethylene content of from 10 to 40% by weight; or vinyl chloride copolymers having from 10 to 40% by weight of ethylene units and from 5 to 40% by weight of vinyl laurate units or units of vinyl esters of α-branched monocarboxylic acids having from 5 to 15 carbon atoms.

* * * * *